United States Patent [19]
Min

[11] Patent Number: 6,024,335
[45] Date of Patent: Feb. 15, 2000

[54] FLAT-PANEL DISPLAY APPARATUS

[75] Inventor: Yoon-Ki Min, Kyungki-do, Rep. of Korea

[73] Assignee: SamSung Electronics Co., Ltd., Kyungki-do, Rep. of Korea

[21] Appl. No.: 08/965,644

[22] Filed: Nov. 6, 1997

[30] Foreign Application Priority Data

Nov. 6, 1996 [KR] Rep. of Korea ...................... 96-52393

[51] Int. Cl.[7] .................................................. A47G 29/00
[52] U.S. Cl. ...................... 248/371; 248/921; 248/183.1; 248/183.2
[58] Field of Search .............................. 248/122.1, 183.2, 248/183.1, 186.2, 371, 919–923, 349.1; 361/681, 682, 683, 825; 364/708.1; 345/905

[56] References Cited

U.S. PATENT DOCUMENTS

| | | | |
|---|---|---|---|
| 4,310,136 | 1/1982 | Mooney | 248/278 |
| 4,437,638 | 3/1984 | Scheibenpflug | 248/282 |
| 4,447,031 | 5/1984 | Souder, Jr. | 248/280.1 |
| 4,762,378 | 8/1988 | Kagami | 312/7.2 |
| 4,919,387 | 4/1990 | Sampson | 248/921 |
| 4,944,481 | 7/1990 | Yurchenco | 248/372.1 |
| 5,108,062 | 4/1992 | Detwiler | 248/185 |
| 5,168,423 | 12/1992 | Ohgami et al. | 361/394 |
| 5,335,142 | 8/1994 | Anderson | 361/681 |
| 5,588,625 | 12/1996 | Beak | 248/371 |
| 5,632,463 | 5/1997 | Sung et al. | 248/371 |
| 5,715,137 | 2/1998 | Choi | 361/681 |
| 5,732,922 | 3/1998 | Jeon | 248/371 |
| 5,751,548 | 5/1998 | Hall et al. | 361/686 |
| 5,854,735 | 12/1998 | Cheng | 361/681 |

*Primary Examiner*—Leslie A. Braun
*Assistant Examiner*—Gwendolyn Baxter
*Attorney, Agent, or Firm*—Robert E. Bushnell, Esq.

[57] ABSTRACT

A flat-panel display apparatus, including a liquid crystal display (LCD) on which images are displayed according to input video signals and a stand for supporting the LCD, has a hinge for connecting the LCD to the stand at a single point. The hinge has a vertical shaft for side-to-side control of the LCD with respect to the stand and a horizontal shaft for forward/backward control of the LCD with respect to the stand.

19 Claims, 7 Drawing Sheets

FLAT-PANEL DISPLAY APPARATUS

CLAIM OF PRIORITY

This application makes reference to, incorporates the same herein, and claims all benefits accruing under 35 U.S.C. §119 from my application entitled flat-panel display apparatus earlier filed in the Korean Industrial Property Office on the 6th day of November 1996, and there duly assigned Ser. No. 96-52393 by that office.

BACKGROUND OF THE INVENTION

1. Field of the Invention

The present invention relates to a display apparatus and, more particularly, to a flat-panel display apparatus enabling bi-directional control of a liquid crystal display (LCD).

2. Discussion of Related Art

The general structure of a flat-panel display apparatus includes a liquid crystal display (LCD), on which images are displayed according to input video signals, and a stand for supporting the LCD and which permits controlling the display direction by moving the LCD with respect to the stand. The purpose of such a structure is to control the display direction of the LCD for optimum viewing by a user.

Exemplars of the contemporary practice in the art include U.S. Pat. No. 4,310,136, issued to Mooney for a Backlash-free Swivel and Tilt Mounting, which describes an oversized support shaft journaled in dual ball bearings housed in a base. The base includes a plate with an aperture receiving a cylindrical section of a support shaft, rotatably secured therein with a set of bearings. The device does not include a central inner passage for a cable. U.S. Pat. No. 4,437,638, issued to Scheibenpflug for an Arrangement for Fastening a Monitor to a Text Station, describes a monitor mounted on a support column with a bracket having holes registered with holes in the support column, a shaft being received therethrough. The support column defines an inner race slidingly received in an outer race of extension arm, providing rotational freedom therebetween. The device does not include a central inner passage for a cable. U.S. Pat. No. 4,447,031, issued to Sounder, Jr. et al for a Spring Counterbalanced Support Arm System, describes a nose bracket mounted on a television set. The nose bracket includes flanges with registered holes. Screws received in the holes engage an anchor tube receiving a tension pin engaged with a swivel arm. The tension pin provides for relative rotation between the swivel arm and nose bracket. The device does not include a central inner passage for a cable. U.S. Pat. No. 5,335,142, issued to Anderson for a Portable Computer Display Tilt/swivel Mechanism, describes a yoke 42 with flanges having registered holes. A tilt base has complementary flanges with registered holes. The yoke and base holes receive a hollow tilt tube. The base mounts on a swivel disk received within a groove defined by a split mounting ring. The device does not include a hinge member having a central aperture configured to receive a vertical hinge shaft, fixed relative to a stand, providing a central inner passage for a cable. U.S. Pat. No. 4,762,378, issued to Kagami for a Display Apparatus, describes a base with oblique or offset upstanding flanges with registered holes. The chassis and neck frame of a monitor pivot relative to the base about a connecting bolt received in the holes. The device does not include a hinge member having a central aperture configured to receive a vertical hinge shaft, fixed relative to a stand, providing a central inner passage for a cable. U.S. Pat. No. 4,944,481, issued to Yurchenco et al for a Balanced Monitor Stand, describes a base with an oblique tab having a first horizontal throughbore. A platform mounted on a monitor has a second throughbore in registry with the first throughbore. The tab and platform rotate in a vertical plane about a pin received in the throughbores. The device does not provide for rotation of the monitor. U.S. Pat. No. 5,108,062, issued to Detwiler for a Pivot Apparatus, describes a clam shell socket member rotatably secured to a housing member. A leg portion extends from one of the clam shell socket members to a base portion mounted in a base member. The device does not provide for rotation of the monitor. U.S. Pat. No. 5,588,625, issued to Beak for a Monitor Stand Assembly, describes an upper stand portion having a slot. A stand base portion has a coupler bar received in the slot. When the upper stand portion is rotated relative to the stand base portion, projections of the coupler bar prevent disassembly thereof. The device does not include a hinge member having a central aperture configured to receive a vertical hinge shaft, fixed relative to a stand, providing a central inner passage for a cable.

After careful study of the exemplars of contemporary practices in the art, I have found a need for a flat-panel display apparatus with a single-point hinge that affords bidirectional adjustment of the display panel relative to the stand on which it is mounted.

SUMMARY OF THE INVENTION

Accordingly, the present invention is directed to a flat-panel display apparatus that substantially obviates one or more of the problems due to limitations and disadvantages of the related art.

An object of the present invention is to provide an improved flat-panel display apparatus having a liquid crystal display (LCD) for displaying images according to input video signals and a stand for supporting the LCD, which enables the bi-directional control of the LCD, i.e., side-to-side and forward/backward movement of the display by the user, through predetermined angles of rotation.

Another object of the present invention is to provide a flat-panel display apparatus having a single-point hinge mechanism which achieves the bi-directional control of the LCD, thereby enabling a compact and new type of stand.

To achieve these and other advantages and in accordance with the purpose of the present invention, as embodied and broadly described, a flat-panel display apparatus has a hinge mechanism connecting an LCD to a stand at a single point. The hinge mechanism is provided with a vertical shaft unit for side-to-side movement of the LCD with respect to the stand and a horizontal shaft unit for the forward and backward movement.

It is to be understood that both the foregoing general description and the following detailed description are merely exemplary and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
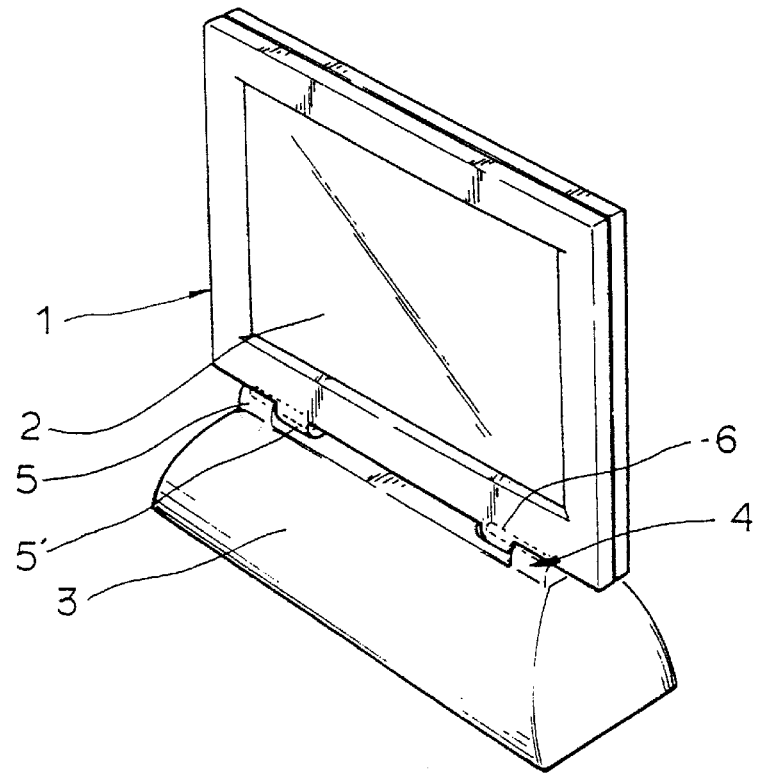
FIG. 1 is a top front perspective view of a flat-panel display apparatus.
Figure 2:
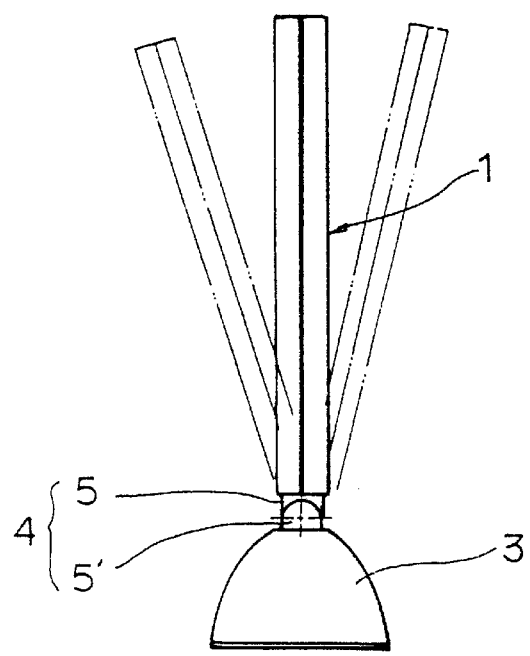
FIG. 2 is a side elevational view of the flat-panel display apparatus of FIG. 1, alternate positions thereof shown in broken lines.

Referring to FIGS. 1 and 2, a flat-panel display apparatus includes a liquid crystal display (LCD) 1 having a liquid crystal panel 2, on which images are displayed according to input video signals, a stand 3 for supporting the LCD, and a hinge mechanism 4 connecting the LCD to the stand and enabling a user to control the viewing direction of the LCD. The hinge mechanism 4 includes hinge pieces 5 and 5' which are combined with the LCD 1 and the stand 3, respectively, with a horizontal hinge shaft 6 linking the hinge pieces. Thus, the LCD 1, being supported by the stand 3, can pivot on the hinge mechanism 4.

The foregoing flat-panel display apparatus has a simple control function for moving the LCD forward and backward. For side-to-side movement, the entire apparatus, including the stand, must be rotated on the supporting surface. Further, in such a display apparatus, a pair of hinge units generally are used, separated by a predetermined distance to ensure stability. The stand, therefore, must have nearly the same length as that of the LCD itself, which limits miniaturization of the stand and restricts the design of the overall apparatus.

Reference now will be made in detail to the preferred embodiment of the present invention, an example of which is illustrated in the accompanying drawings.

Figure 3A:
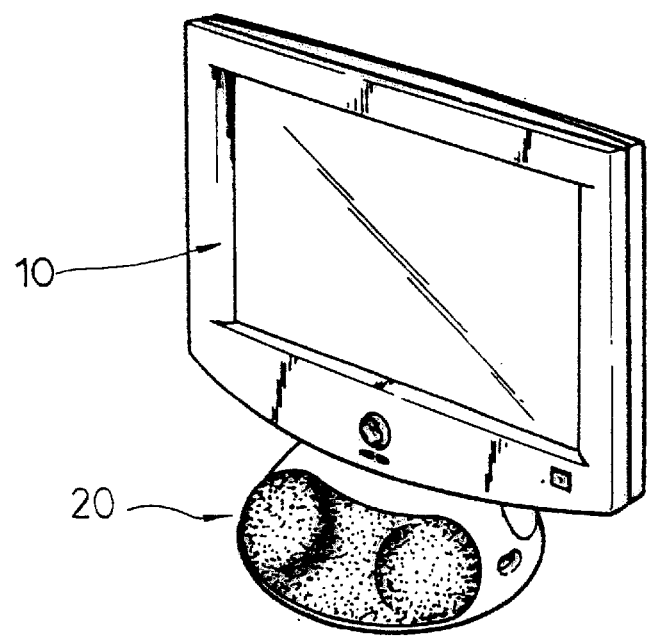
FIGS. 3A and 3B are top right front and left rear views, respectively, of a flat-panel display apparatus constructed according to the principles of the present invention.
Figure 3B:
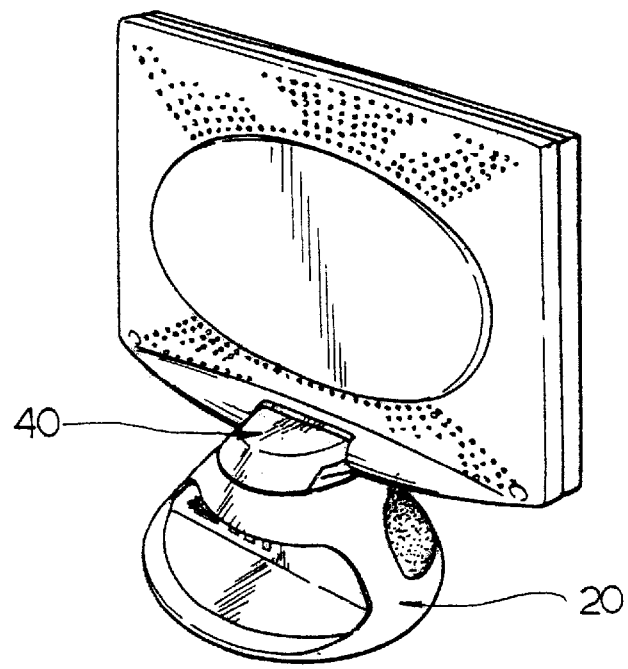
Figure 4:
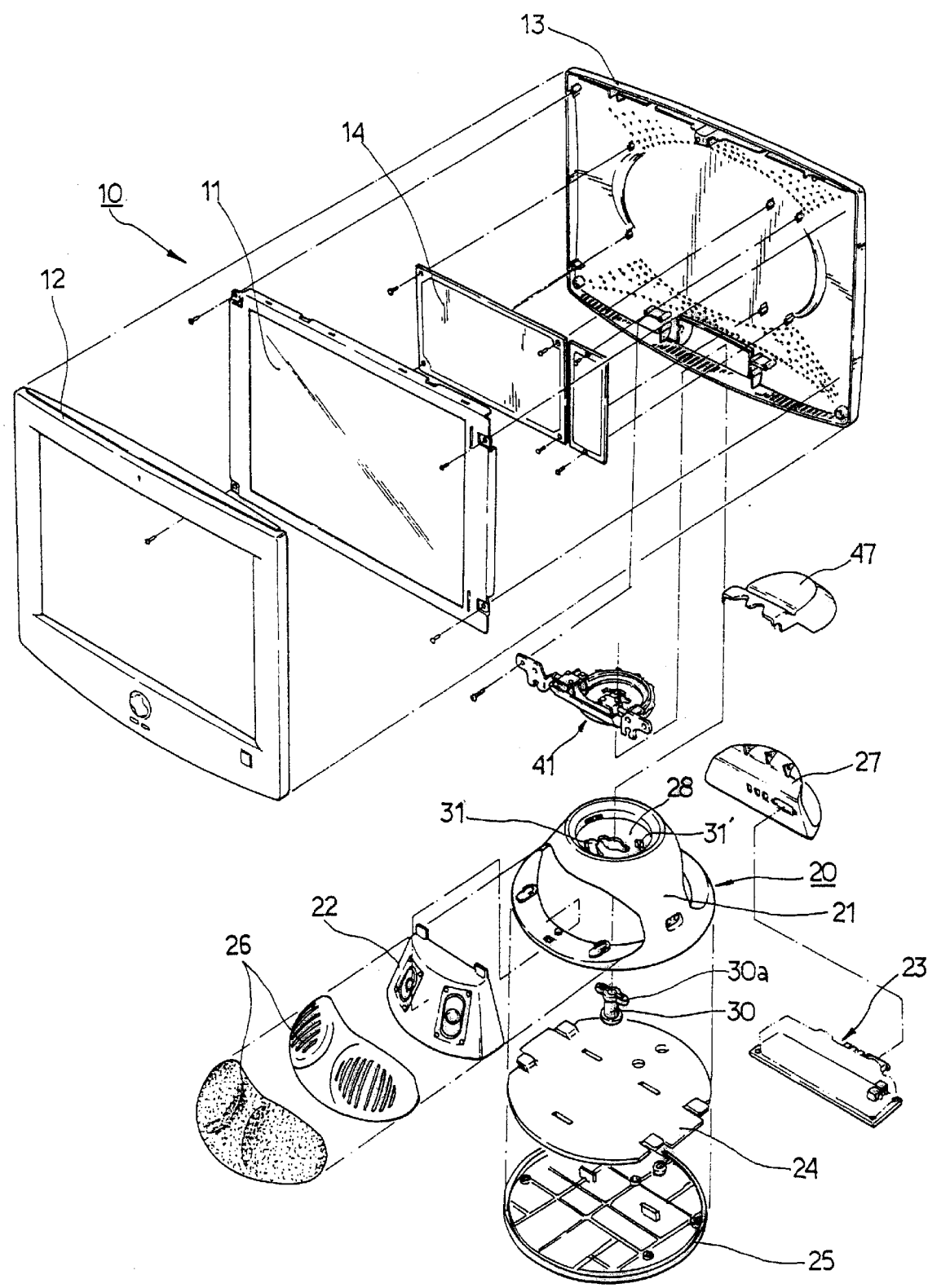
FIG. 4 is top right front exploded perspective view of the flat-panel display apparatus constructed according to the principles of the present invention.
Figure 5:
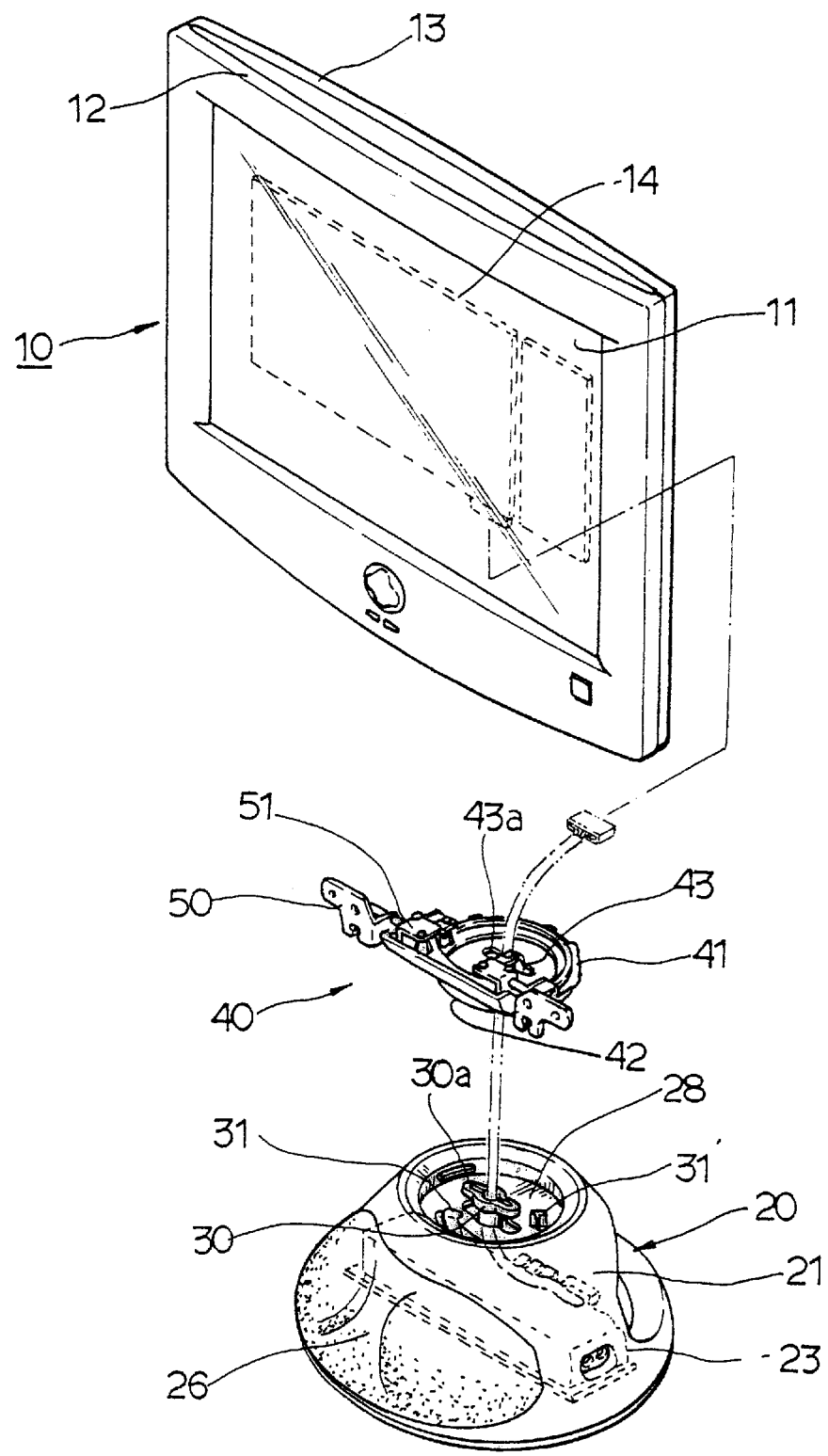
FIG. 5 is another top right front exploded perspective view of the flat-panel display apparatus, partially assembled, constructed according to the principles of the present invention.

Referring to FIGS. 3A and 3B, the flat-panel display apparatus of the present invention is generally is composed of an LCD 10; a stand 20 for supporting the LCD; and a hinge mechanism 40 connected between the LCD and stand, for controlling the LCD's display angle. The detailed structure of a flat-panel display apparatus according to the present invention will be described with reference to FIGS. 4–7.

The LCD 10 includes: a liquid crystal panel 11 on which images are displayed, front and rear cases 12 and 13 which serve as supporting members for the liquid crystal panel, and a main circuit substrate 14 installed on the inside of the rear case 13.

The stand 20 includes: a speaker 22 and an interface circuit substrate 23 installed in a stand body 21; a bottom cover 25 to which a weight 24 is attached, both of which are fixed to the bottom of the stand; speaker covers 26; and an input unit cover 27.

The hinge mechanism 40, as shown in FIG. 3B, largely is composed of a hinge body 41 having a circular rotation guide 42 which has the same shape (i.e., round) as a the inner surface 100 of a rotary guide recess 28 located on the upper portion of the stand body 21, so that the hinge body may be inserted into the stand 20 and slide smoothly therein when rotated.

Figure 6:
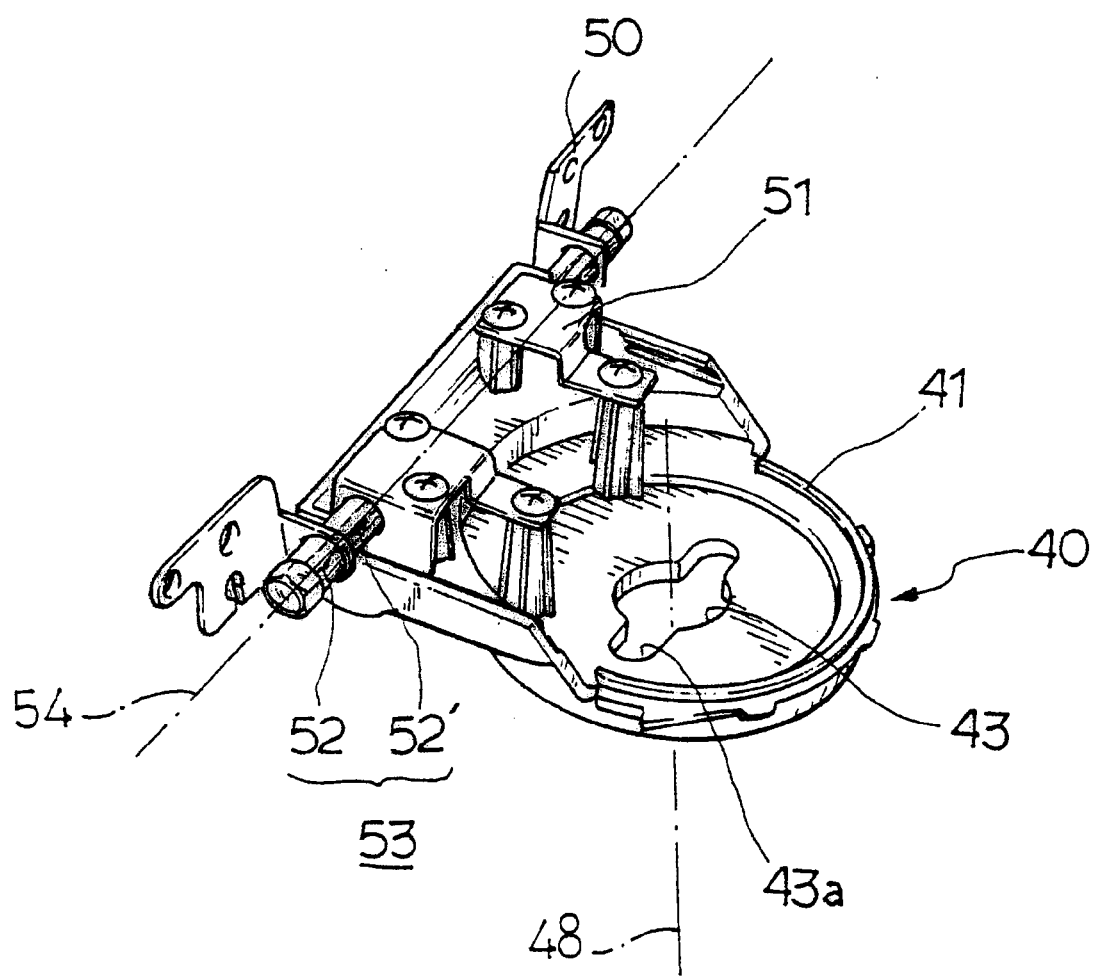
FIG. 6 is a top right rear perspective view of the hinge body of FIGS. 4 and 5, constructed according to the principles of the present invention.
Figure 7:
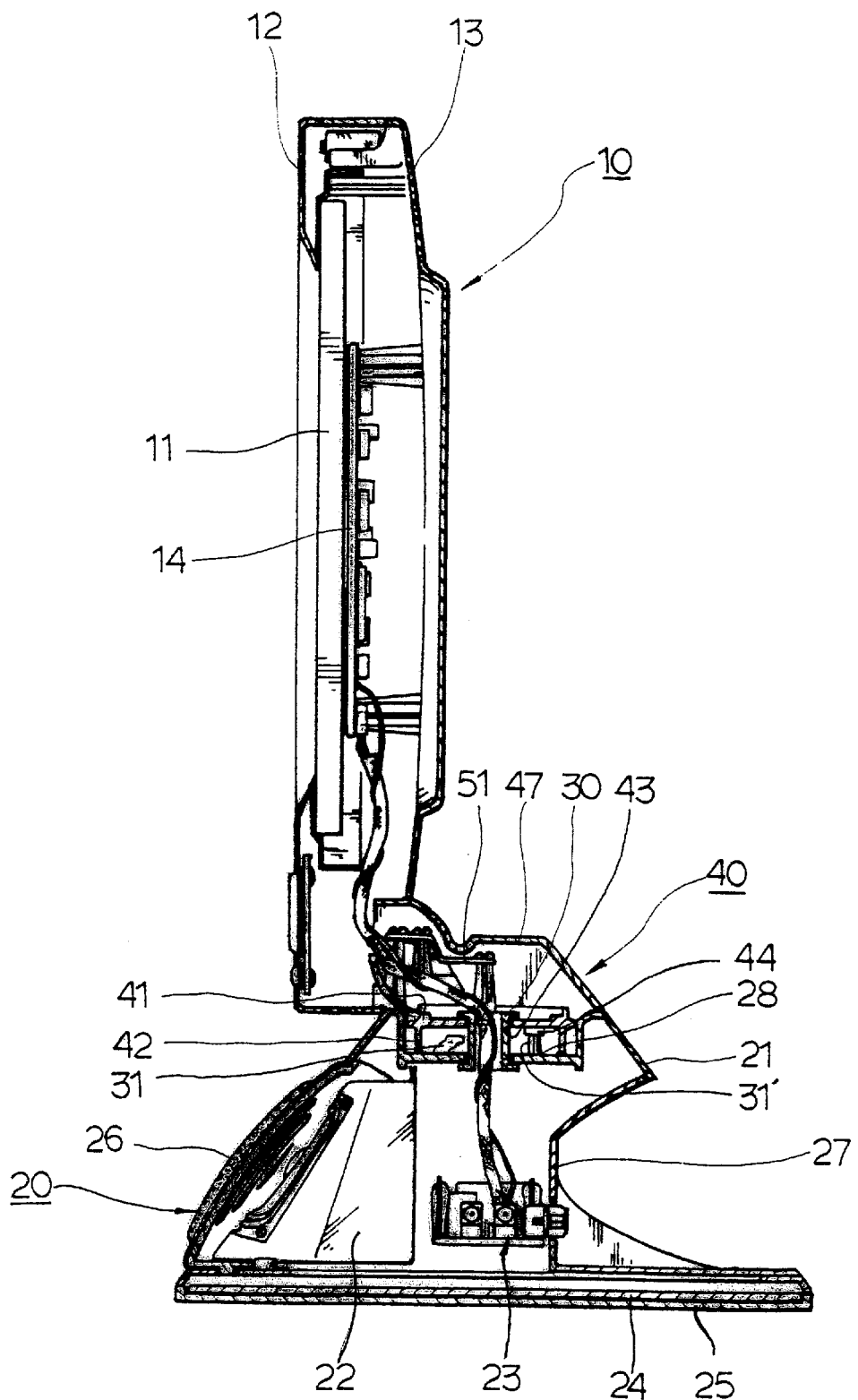
FIG. 7 is a cross-sectional detail view of a flat-panel display apparatus, drawn along line 7—7 in FIG. 3A, constructed according to the principles of the present invention.

The hinge body 41 has a hinge shaft insertion hole 43, best seen on FIG. 6, with insertion guide recesses 43a. The rotary guide recess 28 has a similarly-shaped aperture 200 with recesses 202. If vertical hinge shaft 30 is received in the aperture 200 and hinge shaft insertion hole 43, the ribs 30a being aligned with the recesses 43a and 202 in order to attain appropriate clearance therethrough.

By rotating the hinge body 41 approximately 90°, the ribs 30a of the hinge shaft 30 form an angle of intersection with the hinge shaft insertion hole 43, or are misaligned, thereby preventing the separation of the LCD from the stand. A projection 44 formed on a lower surface of the hinge body 41 moves with the pushing of an elastic jaw 31 formed in the rotary guide recess 28, thereby being rotated between the elastic jaw and a fixed jaw 31'. In other words, once the vertical hinge shaft 30 is installed in the aperture 200 and fixed to the stand body 21, the hinge body 41 is aligned so that the ribs 30a are received through the recesses 43a. When this occurs, the projection 44 contacts the elastic jaw 31, and urges it downwardly. Once the ribs 30a pass through the recesses 43a, the hinge body 41 is rotated clockwise until the projection 44 clears and releases the elastic jaw 31, allowing it to assume its intended design position. Thereafter, the projection 44 is trapped between the elastic jaw 31 and fixed jaw 31'.

As best seen on FIG. 6, the hinge mechanism 40 essentially is provided with a separation preventing unit, preventing separation of the hinge body 41 from the stand body 21, a rotary angle control unit, limiting the rotation of the hinge body in the stand body, and a side-to-side rotation unit, facilitating rotation of the hinge body around the vertical hinge shaft 30.

The display apparatus according to the present invention further is provided with a forward-and-backward rotation unit located at the upper side portions of the hinge body 41. The forward-and-backward rotation unit includes a first bracket 50 fixed at the bottom interior side of the rear case 13 coupling the LCD 10 with the hinge mechanism 40; and a second bracket 51 fixed to the hinge body 41 coupling a horizontal shaft 53 with the hinge mechanism, Here, the horizontal shaft 53 includes shaft bosses 52 and 52', and a rotation unit cover 47 covering both rotation units, as seen on FIG. 4.

As described above, the present invention enables side-to-side adjustment of the display using the side-to-side rotation unit for rotation about a vertical axis 48, and enables forward and backward adjustment of the display using the forward and backward rotation unit for rotation about a horizontal axis 54.

The operation of the flat-panel display apparatus of the present invention now will be discussed with reference to FIGS. 8 and 9.

Figure 8:
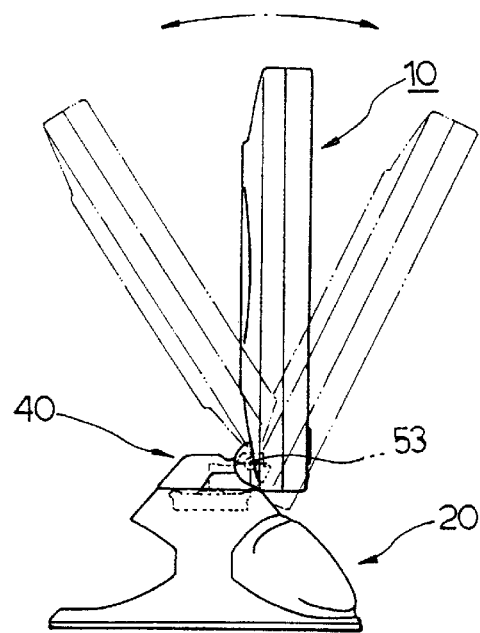
FIG. 8 is a left side elevational view of the LCD unit of a flat-panel display apparatus constructed according to the principles of the present invention, alternate positions thereof shown in broken lines.
Figure 9:
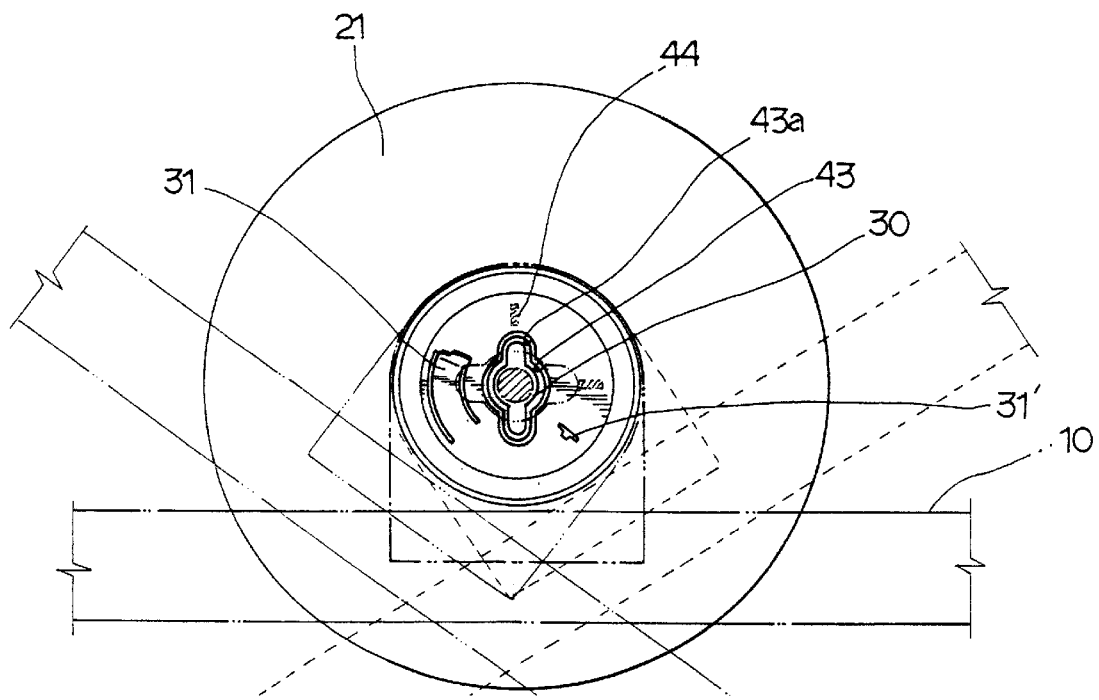
FIG. 9 is a plan view of the LCD unit of a flat-panel display apparatus constructed according to the principles of the present invention, alternate positions thereof shown in broken lines.

FIG. 8 shows the standard control of the display angle by rotating the LCD 10 forward or backward as desired, whereby the rotation of the LCD 10 centers around the horizontal shaft 53. FIG. 9 shows the side-to-side control of the display angle by rotating the LCD 10 to the right or left as desired, whereby the rotation of the hinge body 41 centers around the vertical hinge shaft 30. Accordingly, the flat-panel display apparatus of the present invention can control the displayed screen angle on two axes, enabling a user to freely control the viewing angle in any direction.

Compared with a conventional flat-panel display apparatus which allows only single-axis control of the display, the flat-panel display apparatus of the present invention has an improved screen angle control function. That is, in the present invention, the forward-and-backward rotation unit for the forward and backward control of the display angle and the side-to-side rotation unit for side-to-side control of the display angle are provided in one hinge unit, so that the LCD and stand are joined at just one point. This enables a compact and improved stand design.

It will be apparent to those skilled in the art that various modifications can be made in the flat panel display apparatus of the present invention, without departing from the spirit of the invention. Thus, it is intended that the present invention cover such modifications as well as variations thereof within the scope of the appended claims.

What is claimed is:

1. A flat-panel display apparatus, comprising:
   a LCD having a front case, a panel, and a rear case;
   a stand supporting said LCD, comprised of a rotary guide recess and a first hinge shaft insertion hole; and
   a hinge body connecting said rear case of said LCD to said stand, comprising:
     a horizontal shaft unit rotatably received in said rotary guide recess, comprising:
       a first coupling bracket fixed to said rear case of said LCD;
       a second coupling bracket fixed to said hinge body; and
       a horizontal shaft connecting said first and said second coupling brackets; and
     a vertical shaft unit having a second hinge shaft insertion hole;
     a vertical hinge shaft comprised of ribs formed on opposite sides of one end of said shaft and inserted into said first hinge shaft insertion hole of said stand and said second hinge shaft insertion hole of said vertical shaft unit; and
     said vertical hinge shaft and said hinge body being semi-rotated with respect to each other, thereby locking said hinge body to said vertical hinge shaft and allowing rotation.

2. A hinge for a display apparatus, comprising:
   a hinge body having a rotation guide and a first hinge shaft insertion hole;
   a stand having a rotary guide recess and a second hinge shaft insertion hole, said guide recess receiving said rotation guide;
   a bracket mountable on a rear case of a display housing, rotatably mounted on said hinge body;
   a hinge shaft inserted into said first and second shaft insertion hole to connect said stand to said hinge body; and
   a projection restricting rotation of said hinge body between an elastic jaw and a fixed jaw, extending from said hinge body.

3. The hinge of claim 2, further comprising:
   a shaft extending from said hinge body and contained into inside of said rear case, said bracket being rotatably mounted thereon; and
   a second bracket maintaining said shaft on said hinge body.

4. The hinge of claim 2, further comprised of said first shaft insertion hole.

5. The hinge of claim 4, further comprised of said second shaft insertion hole of said stand having a second center hole and second rib hole extending from said second center hole.

6. The hinge of claim 5, further comprised of said hinge shaft having a rib and a shaft.

7. The hinge of claim 6, wherein said rib is inserted into said first and second rib holes, and said shaft is inserted into said first and second shaft holes.

8. The hinge of claim 2, said hinge shaft having a hole conducting a cable therethrough, said cable connecting a main circuit within said display housing to a interface circuit within said stand.

9. The hinge of claim 8, wherein said cable is passing through said hole of said shaft hinge, said first shaft insertion hole, and said second shaft insertion hole.

10. The hinge of claim 2, wherein said bracket is mounted on a bottom interior side of said rear case of said display housing.

11. A display apparatus, comprising:
    a display housing having a front case, a rear case, and a main circuit disposed between said front and rear cases;
    a stand, comprising:
      a rotary guide recess therein;
      a first hole;
      an elastic jaw; and
      a fixed jaw; and
    a hinge, interposed between said display housing and said stand, comprising:
      a hinge body having a rotation guide and a second hole;
      said rotation guide received in said rotary guide recess, extending from said hinge body;
      a bracket mounted on said display housing, rotatably mounted on said hinge body;
      a projection, restricting rotation of said hinge between said elastic jaw and said fixed jaw, extending from said hinge body; and
      a hinge shaft inserted into said first hole of said stand and said second hole of said hinge.

12. The display apparatus of claim 11, further comprising:
    a shaft extending from said hinge body and being mounted on inside of said rear case, said bracket being rotatably mounted thereon; and
    a second bracket maintaining said shaft on said hinge body.

13. The display apparatus of claim 11, further comprised of
    said hinge shaft further comprising a rib extending therefrom;
    said first and second holes further comprised of a shape complementary of said rib;
    whereby association and disassociation of said shaft and said hinge body is accomplished only when said rib is aligned with said first and second holes.

14. The display apparatus of claim 13, said hinge shaft having a third hole conducting a cable therethrough.

15. The display apparatus of claim 14, further comprised of said cable connecting said main circuit to a interface circuit of said stand through said hole of said hinge shaft.

16. The display apparatus of claim 15, wherein said cable is passing through said shaft insertion hole and said hole of said hinge shaft.

17. The display apparatus of claim 11, further comprising a cover concealing said hinge.

18. The display apparatus of claim 11, wherein said bracket is mounted on said bottom inside of said rear case of said display housing.

19. The display apparatus of claim 11, further comprised of said stand having a speaker mounted on a surface of said stand.

* * * * *